United States Patent [19]

Fowles et al.

[11] 4,452,621
[45] Jun. 5, 1984

[54] DIRECT COOLING CRYSTALLIZATION

[75] Inventors: Patrick E. Fowles, Boylestown; Tsoung Y. Yan, Philadelphia, both of Pa.

[73] Assignee: Mobil Oil Corporation, New York, N.Y.

[21] Appl. No.: 424,712

[22] Filed: Sep. 27, 1982

[51] Int. Cl.³ .............................................. E01D 9/02
[52] U.S. Cl. ................................................... 62/534
[58] Field of Search .......................... 62/532, 533, 534

[56] References Cited

U.S. PATENT DOCUMENTS 2,078,992 5/1937 Banks et al. ........................... 62/534

Primary Examiner—Frank Sever
Attorney, Agent, or Firm—A. J. McKillop; M. G. Gilman; J. F. Powers, Jr.

[57] ABSTRACT

A crystallization process is improved by employing direct contact cooling whereby a volatile liquid is vaporized to provide the cooling necessary to effect the crystallization. The effluent vapors of the volatile liquid may be liquified and recycled for reuse by manipulation of temperature and/or pressure. In one embodiment, durene is crystallized from a $C_{10}{}^+$ aromatics fraction using liquified n-butane as the coolant.

10 Claims, 1 Drawing Figure

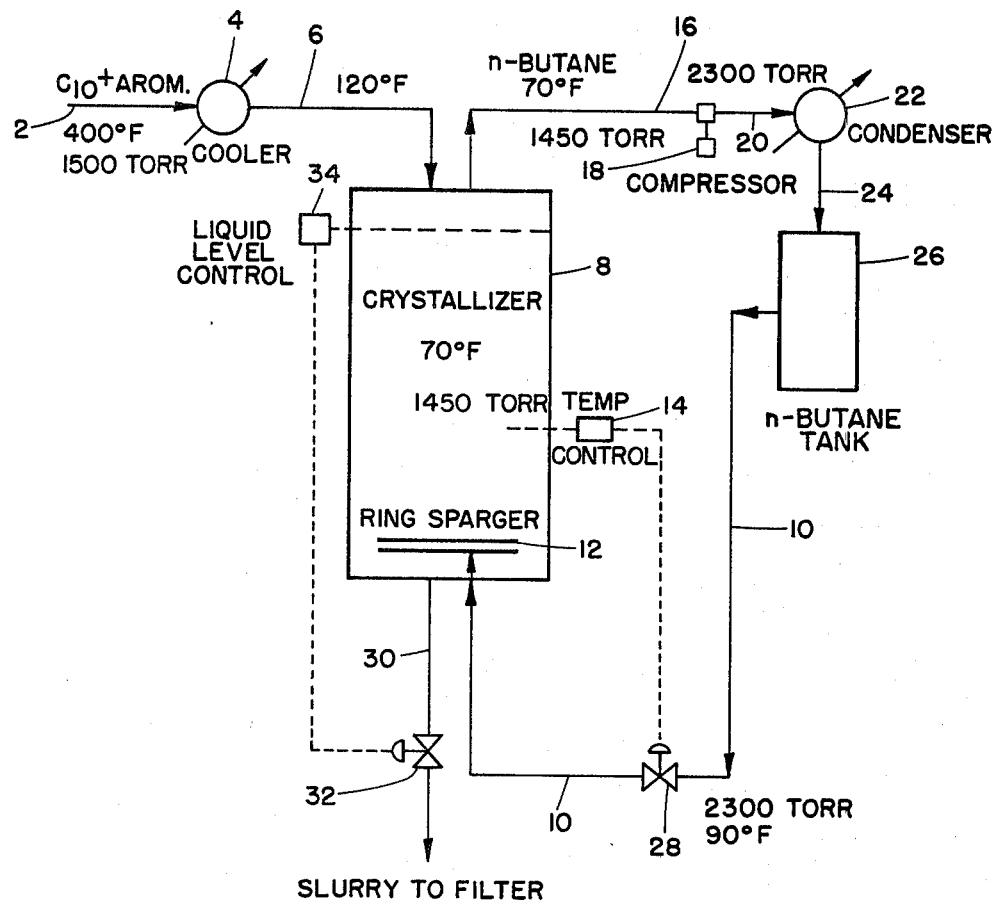

DIRECT COOLING CRYSTALLIZATION

BACKGROUND OF THE INVENTION

1. Field of the Invention

This invention relates to the separation of liquids by crystallization. More particularly, this invention relates to the cooling of a liquid containing a crystallizable material by means of a volatile liquid. This invention especially relates to the direct cooling of a liquid containing a crystallizable material by the controlled vaporization of a volatile liquid.

2. Description of the Prior Art

Crystallization to recover such basic materials as salt and sugar has been practiced for centuries. Voluminous quantities of crystalline substances are produced commercially each year. Sodium chloride, sodium and ammonium sulfates and sucrose are produced worldwide in excess of 100 million tons per year. Many of the fine organic chemicals and pharmaceutical chemicals are produced in crystalline form. Crystallization is often employed as an alternate to fractional distillation to separate azeotropes and close boiling mixtures. For example, para-xylene is separated by crystallization from equilibrium mixtures of its isomers, meta and ortho xylene and other $C_8$ aromatic hydrocarbons. In addition, crystallization separations are often attractive because the heat of crystallization is usually significantly lower than the comparable heat of vaporization and the crystallization can be conducted nearer to ambient temperatures than distillation.

Crystallization normally involves the removal of both sensible and latent heat to produce the crystalline product. Indirect heat transfer has been employed in crystallization processes heretofore but crystal formation on the surface of the coils, jackets and heat exchanger tubes reduces the effectiveness of the heat transfer surface. Scraped-surface crystallizers have also been employed in the form of jacketed vessels and double-pipe heat exchangers but maintenance of the equipment can be costly and time-consuming.

Direct contact cooling avoids many of the problems of the scraped-surface crystallizers. However, although direct contact cooling provides improved heat transfer and eliminates the crystal formation on heat transfer surfaces, product contamination and recovery of the coolant can cause problems. In this type of cooling, the coolant may be a solid, a liquid or a gas and it may transfer sensible and/or latent heat. Thus the coolant may or may not evaporate during use and it may be miscible or immiscible with the mother liquor.

The evaporation of a light hydrocarbon to provide sufficient cooling for crystallizing a crystallizable material from a hydrocarbon mixture is well known in the petroleum industry in such processes as the dewaxing of lubrication oils and the separation of para-xylene from its isomers. U.S. Pat. No. 2,614,065 of Wanderer et al. and U.S. Pat. No. 3,443,391 of Storment et al. disclose the propane dewaxing of lubricating oil wherein propane is employed as a direct contact refrigerant to crystallize wax from lube oil feedstocks. U.S. Pat. No. 3,859,811 of Duncan discloses the use of direct contact Freon refrigerants to crystallize para-xylene from a mixture of para and meta xylene and the use of ethane, ethylene or Freon refrigerants to dewax oil in a direct contact cooling process. After evaporation, the direct contact refrigerants are condensed by means of a closed loop refrigeration system and returned for reuse.

The recovery of durene by crystallization from a mixture of hydrocarbons is disclosed in U.S. Pat. No. 2,560,373 of Shmidl, U.S. Pat. No. 2,815,392 of Bown, U.S. Pat. No. 2,914,586 of Walker and U.S. Pat. No. 3,103,541 of Smith et al. Although the processes disclosed in these patents employ indirect cooling means or unspecified cooling means to cause durene to crystallize from a hydrocarbon mixture, none of them provide details of the refrigerant or its use. All of these patents are concerned with either the recovery of durene in a high degree of purity or with improvements in the crystallization operation itself.

It is an object of this invention to provide a crystallization process employing direct contact cooling.

It is another object of this invention to provide a crystallization process wherein the direct contact refrigerant is employed substantially at room temperature and at slightly above atmospheric pressure.

It is yet another object of this invention to provide a crystallization process which minimizes energy consumption and pollution.

It is a further object of this invention to provide a crystallization process which requires minimum equipment and investment costs.

It is another object of this invention to provide a process for the crystallization of durene from a hydrocarbon mixture by means of a direct contact refrigerant.

The achievement of these and other objects will be apparent from the following description of the subject invention.

SUMMARY OF THE INVENTION

In accordance with the present invention, it has been found that a liquid mixture containing a crystallizable material can be cooled by adding a volatile liquid to the mixture at a controlled pressure. The temperature of the mixture is lowered to the crystallization temperature by the vaporization of the volatile liquid and is maintained at this temperature by the rate of addition of the volatile liquid. The effluent vapors are liquified and recycled by manipulation of the temperature and/or the pressure in the recycle system.

In particular this invention relates to a method of crystallization which comprises:

(a) introducing a liquid comprising a crystallizable material at a temperature above the crystallization temperature of said material into a crystallization zone maintained under pressure and temperature conditions effective to cause crystallization of said crystallizable material, (b) introducing into the crystallization zone an effective amount of a volatile liquid at about the temperature maintained in said crystallization zone, whereby said volatile liquid vaporizes in said crystallization zone, said volatile liquid having a boiling point, at 760 torr, about 0° to about 60° F. below said crystallization zone temperature and a vapor pressure at said crystallization zone temperature about 50 to about 200 torr above the crystallization zone pressure and said effective amount being sufficient to remove, upon evaporation of said volatile liquid, sufficient heat from the crystallization zone to cause crystallization of said crystallizable material, and (c) recovering crystallized material from said crystallization zone.

In an optional embodiment of this invention, the evaporated volatile liquid is compressed, condensed, cooled and returned to the crystallization zone.

In another embodiment of this invention, the evaporated volatile liquid is condensed by indirect heat exchange with a refrigerant and returned to the crystallization zone.

In a preferred embodiment of this invention n-butane is employed to crystallize durene from a $C_{10}+$ aromatics fraction.

BRIEF DESCRIPTION OF THE DRAWING

FIG. 1 is a schematic flowplan of an embodiment of the invention.

DESCRIPTION OF THE PREFERRED EMBODIMENTS

The present invention relates to a method of crystallization employing direct contact cooling whereby a volatile liquid is vaporized to provide the cooling necessary for the crystallization. The volatile liquid may be reused in the process by condensing and recycling the condensed liquid to the crystallization zone. The evaporated liquid may merely be condensed by indirect heat exchange with a refrigerant or, as in a typical refrigeration or heat pump cycle, compressed, condensed, cooled, and expanded to the crystallization zone pressure.

The process of this invention may be employed to crystallize a wide variety of materials which are conventionally crystallized by known processes. These include such products as sodium chloride, sucrose, sodium and ammonium sulfates, organic fine chemicals, pharmaceutical chemicals, and crystalline hydrocarbons, such as para-xylene and durene.

In order to operate the process of this invention economically at moderate temperatures and pressures, the volatile liquid employed as the refrigerant should boil at or below the crystallization temperature to avoid maintaining the system under vacuum. However, the boiling point of this volatile liquid, at 760 torr, should not be more than about 60° F. below the crystallization temperature to avoid high operating pressures. These criteria may be easily met by employing a hydrocarbon coolant of various isomers with various carbon numbers. Therefore, a suitable hydrocarbon coolant can normally be selected for a given crystallization system without an undue amount of investigation. Obviously, the volatile liquid selected must be compatible with the crystalline material and the mother liquor in that, inter alia, there are no unnecessary chemical side reactions and no undesirable residues remaining in the crystalline product.

By tailoring the direct contact refrigerant to the crystalline process of concern, energy costs and initial equipment investment can be minimized. In many instances, a crystallization process may be designed without giving adequate consideration to the cooling means. Often a known or commercially available refrigeration system is specified and then the operating conditions for the crystallization are tailored to this refrigeration system. This does not always insure that the most economical operating conditions are being employed. When practicing the process of the present invention, however, the direct contact refrigerant is selected so that it bears a particular relationship to the crystallization temperature and pressure which should be initially specified as close to atmospheric pressure and ambient temperature as the inherent properties of the crystalline product will permit. By proceeding in this fashion, initial capital investment and operating cost will be minimized, in most instances.

In practicing the process of this invention with the selected direct contact refrigerant, it is most convenient to reuse the refrigerant. This volatile liquid is introduced into the crystallizer together with the mother liquor containing the crystallizable material. Under the design operating conditions, the liquid refrigerant vaporizes absorbing heat from the mother liquor so as to reduce the temperature to the crystallization range. The volatilized refrigerant passes through the mother liquor and is removed from the vapor space of the crystallizer. The refrigerant may be condensed to a liquid and returned to the crystallizer by either of two known means.

In one of these systems, an auxilary closed loop refrigeration system is employed wherein the refrigerant of this closed loop system is passed in indirect heat transfer relationship with the vaporized refrigerant from the crystallizer to condense the crystallizer refrigerant which is then recycled to the crystallizer for reuse.

In the second system, the crystallizer refrigerant is passed through a conventional refrigeration or heat pump loop, such as those that are well known in the art. The evaporated refrigerant is passed from the crystallizer to a compressor where its pressure is increased under substantially isentropic conditions to a level where it may be effectively condensed by indirect heat exchange with available cooling means, e.g. water or air. After being condensed, the liquid refrigerant is expanded under substantially isenthalpic conditions to about the pressure of the crystallizer and passed in liquid form to the crystallizer where it again evaporates to provide the necessary cooling for the process.

The practice of this invention will be described herein by referring to a preferred embodiment, the crystallization of durene from a $C_{10}+$ aromatics fraction. This is being done for illustrative purposes only, since those skilled in the art will appreciate that the benefits of this invention will be also obtained when other crystallizable materials are the product of the process.

In the methanol to gasoline (MTG) process developed by Mobil Oil Corporation, wherein methanol is catalytically converted to gasoline boiling range hydrocarbons in the presence of a ZSM-5 type zeolite, a $C_{10}+$ aromatics stream is produced which contains a recoverable quantity of durene. Crystallization of the durene from this stream has been suggested as a means of recovering the durene in a pure, saleable form.

Referring to FIG. 1, which presents a flowplan of an emobidment of this invention, a $C_{10}+$ aromatics fraction containing durene is passed at about 400° F. and 1500 torr through line 2 to cooler 4 where the temperature is reduced to about 120° F. The cooled fraction then passes through line 6 to crystallizer 8. The incipient crystallization temperature of this fraction is about 110°–115° F. n-Butane is supplied through line 10 to ring sparger 12 to maintain the crystallizer at about 70° F. The crystallizer pressure is controlled at about 1450 torr which is about 150 torr lower than the vapor pressure of n-butane at the crystallizer temperature of 70° F. Under these conditions the liquid n-butane passing from ring sparger 12 rapidly vaporizes to absorb heat and cool down the $C_{10}+$ aromatics fraction causing crystals of durene to form. The vaporized n-butane rising through the slurry provides agitation to promote the crystallization. The crystallizer temperature is controlled by temperature controller 14 which regulates the flow of liquid n-butane into the crystallizer. The n-butane vapor leaves the crystallizer through line 16 at about 70° F. and 1450 torr and passes to compressor 18 where it is compressed to about 2300 to about 2600 torr. At this pressure the n-butane can be condensed at about 90° to about 100° F. without refrigeration using a water cooled or an air cooled condenser. The compressed n-butane leaves the compressor through line 20 and is delivered to water cooled condenser 22 where it is condensed. The liquid n-butane passes from the condenser through line 24 to n-butane supply tank 26 for reuse. When additional cooling is required in crystallizer 8, temperature controller 14 causes valve 28 to open whereby the n-butane passes through line 10 to ring sparger 12 where it vaporizes to provide the required cooling. The n-butane loop acts like a heat pump wherein the n-butane is compressed substantially isentropically and is then expanded substantially isenthalpically to cause the heat to flow from the crystallizer to the cooling water in the condenser.

The crystallizer should be sized to provide a residence time of about 0.5 to about 10 hours. The slurry containing the crystalline durene is discharged from crystallizer 8 through line 30 and control valve 32 which is controlled by liquid level controller 34. The slurry is delivered to a filter (not shown) where the durene crystals are recovered.

What is claimed is:

1. A method for operating a crystallization process at minimum initial capital investment and operating costs which comprises:
   (a) preselecting crystallization zone pressure and temperature conditions sufficient to provide said minimum capital investment and operating costs for the crystallization of a crystallizable material,
   (b) selecting a direct contact refrigerant based on said crystallization zone pressure and temperature conditions, said direct contact refrigerant being a volatile liquid having a boiling point, at 760 torr, about 0° to about 60° F. below said crystallization zone temperature and a vapor pressure at said crystallization zone temperature about 50 to about 200 torr above said crystallization zone pressure;
   (c) introducing a liquid comprising said crystallizable material at a temperature above the crystallization temperature of said material into a crystallization zone maintained under said crystallization zone pressure and temperature conditions, said pressure and temperature conditions effective to cause crystallization of said crystallizable material,
   (d) introducing into the crystallization zone an effective amount of said volatile liquid at about the temperature maintained in said crystallization zone, whereby said volatile liquid vaporizes in said crystallization zone, and said effective amount being sufficient to remove, upon evaporation of said volatile liquid, sufficient heat from the crystallization zone to cause crystallization of said crystallizable material, and
   (e) recovering crystallized material from said crystallization zone.

2. A method according to claim 1 including the following additional steps:
   (f) compressing the evaporated volatile liquid of step (d) under substantially isentropic conditions to a pressure at which the compressed evaporated liquid may be effectively condensed by indirect heat exchange with available cooling means,
   (g) condensing the evaporated volatile liquid by indirect heat exchange with an available coolant;
   (h) expanding the condensed volatile liquid under substantially isenthalpic conditions to about the crystallization zone pressure, and
   (i) passing said condensed liquid to step (d) as the volatile liquid.

3. A method according to claim 2 wherein the liquid of step (e) is a $C_{10}{}^+$ aromatics stream, the crystallizable material is durene, the volatile liquid is n-butane, the crystallization zone pressure is about 1400 to about 1500 torr and the crystallization zone temperature is about 65° to about 75° F.

4. A method according to claim 3 wherein the pressure of step (f) is about 2300 to about 2600 torr and the condensing temperature is about 90° to about 100° F.

5. A method according to claim 2 wherein the coolant in step (g) is water.

6. A method according to claim 5 wherein the condensing temperature is about 55° to about 65° F.

7. A method according to claim 2 wherein the coolant in step (g) is air.

8. A method according to claim 1 including the following additional steps:
   (j) condensing the evaporated volatile liquid of step (d) by indirect heat exchange with a refrigerant, and
   (k) passing said condensed liquid to step (d) as the volatile liquid.

9. A method according to claim 8 wherein the liquid of step (c) is a $C_{10}{}^+$ aromatics stream, the crystallizable material is durene, the volatile liquid is n-butane, the crystallization zone pressure is about 1400 to about 1500 torr and the crystallization zone temperature is about 65° to about 75° F.

10. A method according to claim 1 wherein the liquid of step (c) is a $C_{10}{}^+$ aromatics fraction, the crystallizable material is durene and the volatile liquid is n-butane.

* * * * *